United States Patent [19]
Helbing

[11] 4,261,720
[45] Apr. 14, 1981

[54] METHOD AND SYSTEM FOR PURIFYING FIBER-RESIN EMISSIONS

[75] Inventor: Clarence H. Helbing, Shelbyville, Ind.

[73] Assignee: Knauf Fiber Glass GmbH, Shelbyville, Ind.

[21] Appl. No.: 96,204

[22] Filed: Nov. 20, 1979

[51] Int. Cl.³ .................. C03B 37/02; C03C 25/02
[52] U.S. Cl. .......................... 65/2; 55/101; 65/3 R; 65/3 C; 65/4 R; 65/5; 65/11 R; 65/27; 264/121; 425/7
[58] Field of Search ............ 65/2, 5, 16, 27, 3 C, 65/11 R, 4 R, 9; 210/65; 55/101, 31; 264/121; 425/7

[56] References Cited

U.S. PATENT DOCUMENTS

| | | | |
|---|---|---|---|
| 4,087,267 | 5/1978 | Goutte et al. | 65/5 |
| 4,105,424 | 8/1978 | Levecque et al. | 65/3 C |
| 4,111,672 | 9/1978 | Battigelli et al. | 65/3 C |

Primary Examiner—Robert L. Lindsay, Jr.

[57] ABSTRACT

A method and apparatus for purifying waste product emissions from the manufacture of glass fiber products, including a system in which an electrostatic precipitation may or may not be employed, and in which separate, and easily controlled, forming air and oven air scrubbing systems are employed.

8 Claims, 4 Drawing Figures

LEGEND
P — PRODUCT (GREEN AND CURED)
PM — PARTICULATE MATTER
A — AIR
W — WATER
R — RESIN
MG — MOLTEN GLASS
F — FIBER
•—• — FIGURE 2 ONLY
✳—✳ — FIGURE 3 ONLY

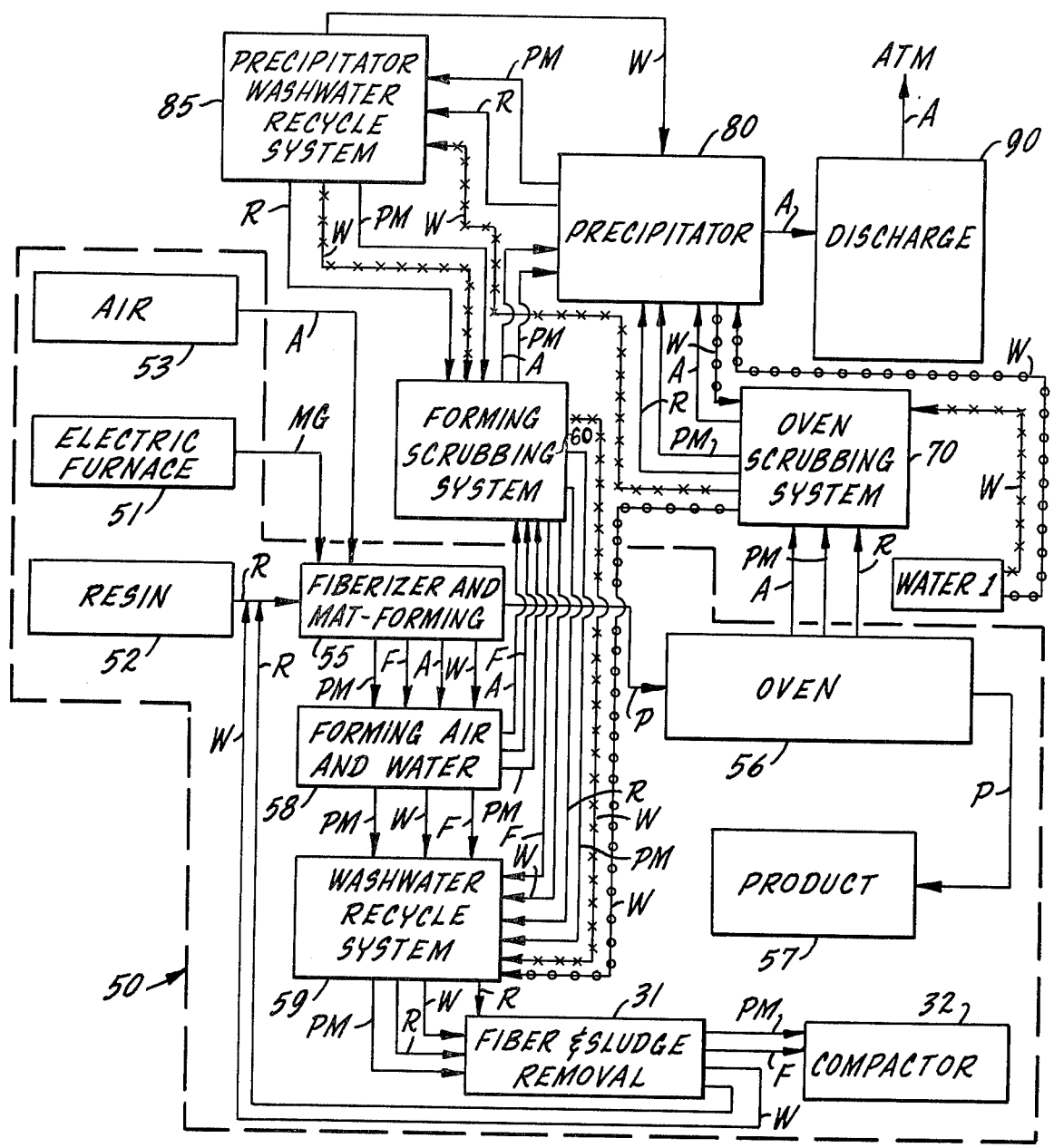

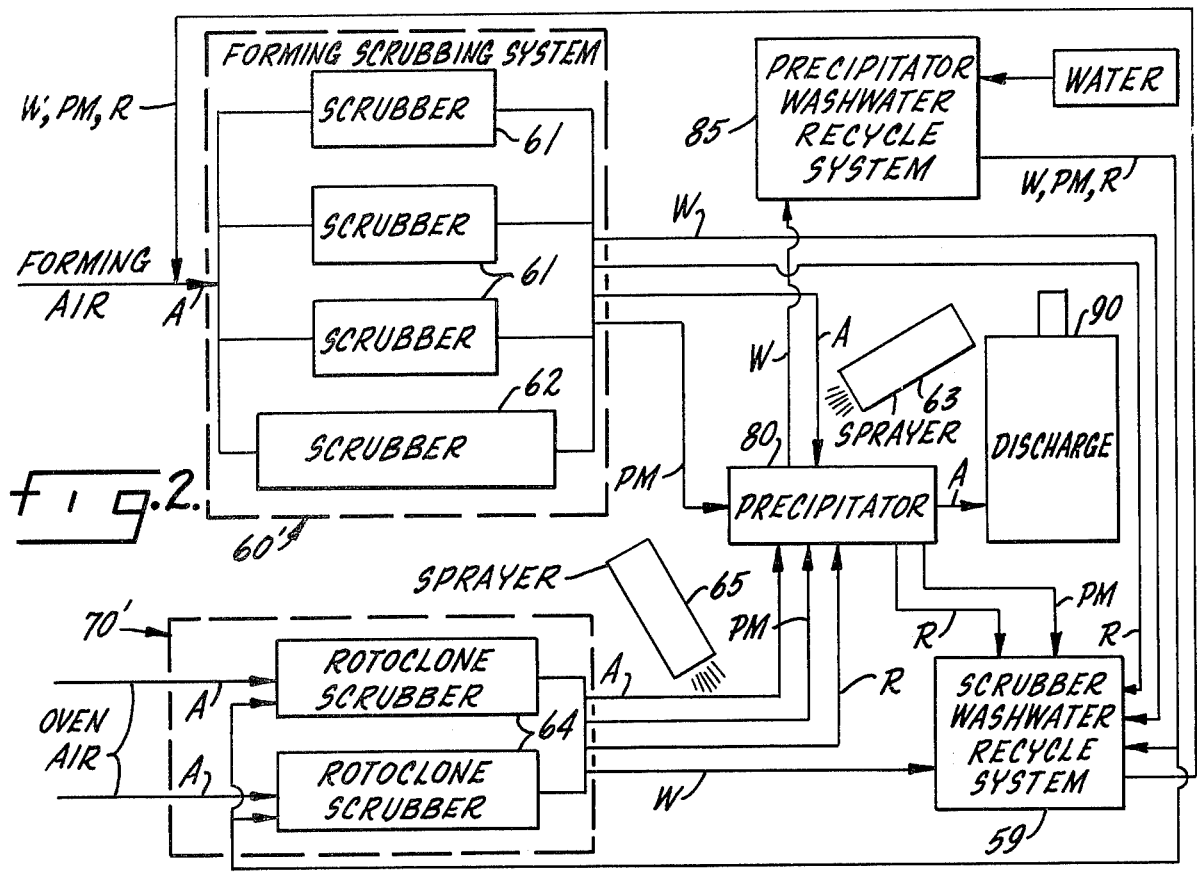
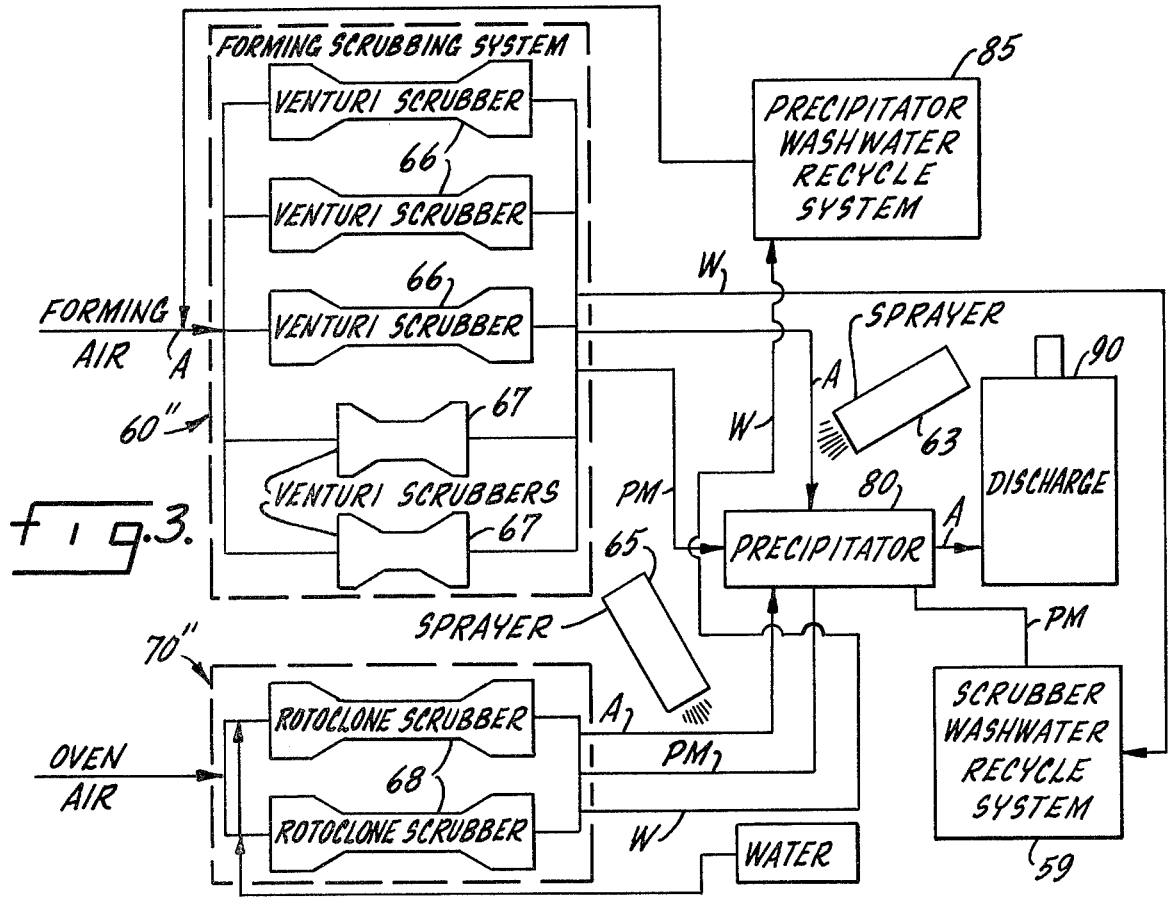

METHOD AND SYSTEM FOR PURIFYING FIBER-RESIN EMISSIONS

This invention relates generally to the art of regulating and purifying the emission of chemical waste products into the atmosphere, and is especially adaptable for use in purifying waste product emissions associated with the manufacture of fiber glass insulation. The invention, however, is applicable to any manufacturing process involving the purification of gaseous, liquid and solid waste.

BACKGROUND OF THE INVENTION

Purifying emissions of chemical waste, such as fiber resins and other pollutants from fiber glass insulation manufacturing facilities, is an increasingly difficult problem. Strict environmental standards and the need to operate such facilities at a continuous and efficient level of production have given rise to a need for a safe, highly efficient, and reliable system for purifying emissions.

The variety of apparatus and systems currently available do not economically provide for the purification of emissions at environmentally acceptable levels. In addition, none of the apparatus and systems found in the prior art and in current technology has been able to eliminate effectively the inherent safety dangers and operating problems caused by the accumulation of particulate matter in the purification system. These accumulations are especially dangerous in exhaust ducts leading from high-temperature manufacturing operations where they pose serious fire hazards. The accumulations also hinder the overall effectiveness of the purification system by lowering its efficiency and requiring it and the fiber glass insulation manufacturing operation to be shut-down for periodic cleaning.

Accordingly, it is a primary object of the invention to provide a process and system for purifying waste associated with the manufacture of fiber glass insulation which is efficient, economical, environmentally acceptable, and avoids fire hazards and other disadvantages of currently known systems.

A further object is to provide a process and system as above described in which freshly screened water is always pumped through orifices or restricted liquid flow paths whereby coagulation is minimized and blockage of spray tips, inlet ducts, fans, and, (if used), an electrostatic precipitator is prevented.

Another object of the invention is to purify such waste emissions by utilizing scrubbing systems designed to effectively remove particulate matter therefrom.

A specific object of the invention is to purify such emissions by utilizing separate scrubbing systems on forming air exhaust from the fiber glass insulation forming process and on oven air exhausted from the fiber glass insulation oven process.

Yet another object of the invention is to further purify such emissions by channelling scrubbed forming air and oven air through precipitator means and discharge prior to ultimate discharge into the atmosphere.

Yet a further object of the invention is to purify said emissions by channelling oven air emissions from the oven process through a scrubbing system and then into the forming process where the exhausted forming air may be further scrubbed and passed through discharge means prior to ultimate discharge into the atmosphere.

Other objects and advantages of the invention will become apparent from a reading of the following exemplary description thereof.

DESCRIPTION OF THE INVENTION

FIG. 1 is a diagrammatic view of the invention, also illustrating a fiber glass insulation manufacturing process used in connection therewith.

FIG. 2 is a diagrammatic view of a specific embodiment of the invention, but with certain elements, such as "FIBER", and certain other elements already identified in FIG. 1, but which are not present in large quantities, none of which is essential to an understanding of the concepts, omitted for clarity and ease of understanding.

FIG. 3 is a diagrammatic view of another specific embodiment of the invention, again with certain elements, such as "FIBER", and certain other elements already identified in FIG. 1, but which are not present in large quantities, none of which is essential to an understanding of the concepts, omitted for clarity and ease of understanding.

Figure 4:
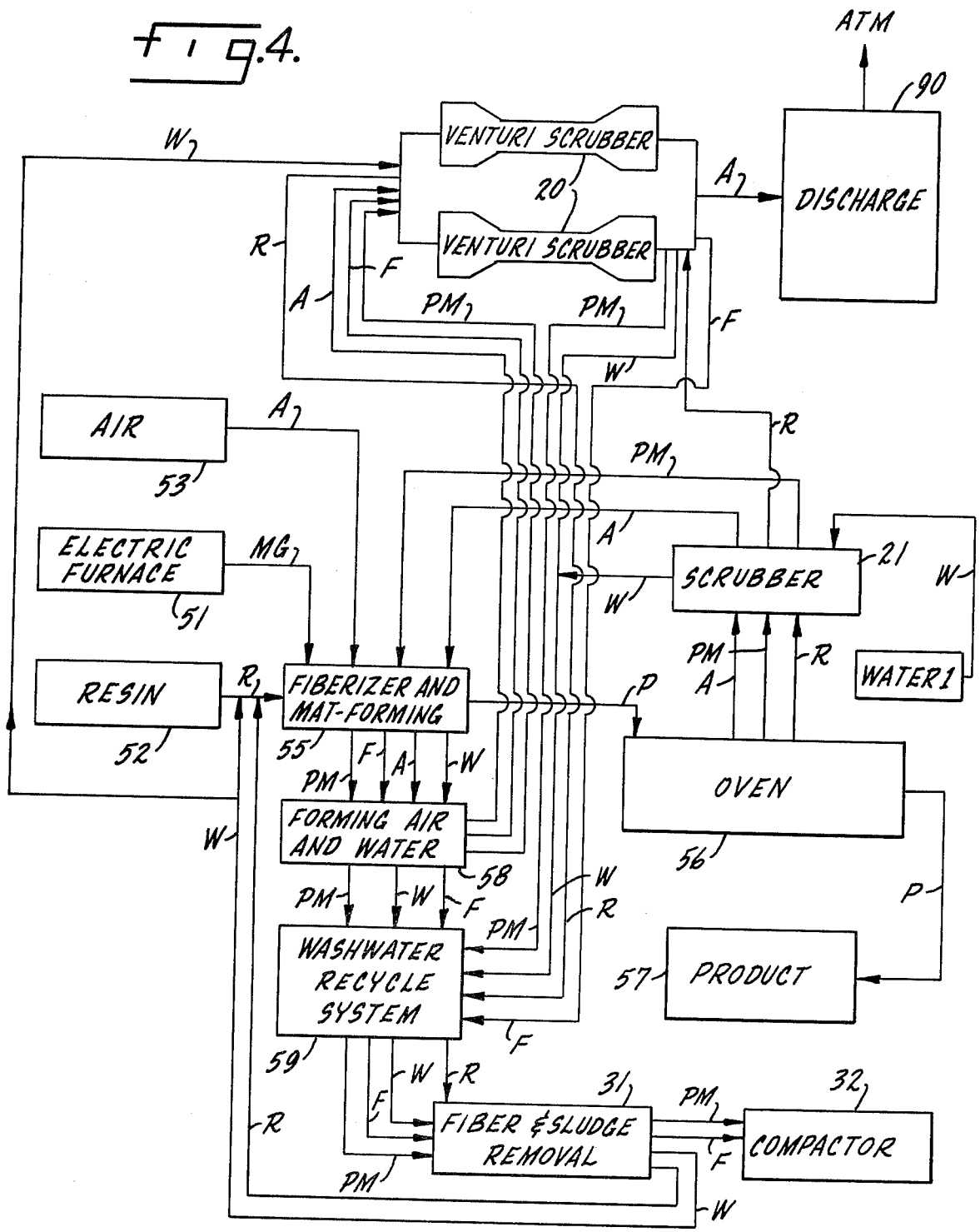
FIG. 4 is a diagrammatic view of yet another specific embodiment of the invention shown in conjunction with a fiber glass insulation manufacturing process in which an electrostatic precipitator is eliminated, and in which only major flows of air, water, particulate matter, resin and molten glass are identified.

Referring to FIG. 1, which shows a preferred embodiment of the invention, a rotary process fiber glass insulation manufacturing system is shown for purposes of illustrating and describing a specific application of the invention. It will be appreciated, however, that the invention is useful in connection with any manufacturing system requiring the regulation and purification of gaseous, liquid, and solid waste emissions resulting therefrom.

A fiber glass insulation manufacturing system is shown generally at 50. Raw material ingredients typically comprising silica, nepheline syenite, borax, soda ash, dolomite, and limestone are batched into an electric furnace 51 wherein a glass melt is produced. The molten glass flows from the furnace to fiberizer and mat-forming process 55, hereinafter referred to as forming process, wherein glass filaments are formed and cut into random lengths. Resin 52 is introduced into the forming process in the presence of air 53 and water to provide for matting of the glass filaments. The resin is sprayed on the mass as it falls downwardly in the presence of the co-current air stream to a forming conveyor. The mass, or product, is then discharged and conveyed to a continuous curing oven 56 wherein heated air is circulated in the presence of raw materials comprising urea, oil, silane, ammonia, ammonium sulfate and water to set the resin and bind the mat together. The product discharged from the oven process 56 is then trimmed, the trimmings being pulverized and recycled to process (not shown), cut into lengths, and boxed as end product 57.

Pollutant water, air, and particulate matter is discharged from the forming process as shown at 58. Water and entrained particulate matter are drained to washwater recycle system 59. The particulate matter is eventually discharged through fiber and sludge removel system 31 and compactor 32. Washwater drained from the fiber and sludge removal system is cleaned and recycled to the manufacturing process.

It should be particularly noted that useable resin is recovered or recaptured and returned to the system.

That is, that portion of the resin which remains soluble is useable and is recovered; that portion which is insoluble is filtered out.

It will be appreciated that the air discharged from the forming process (hereinafter sometimes referred to as "forming air") has entrained particulate matter, both of which are pulled from the forming process and passed through the forming scrubbing system of the invention, shown generally at 60. In the forming scrubbing system, the forming air is purified of entrained particulate matter by means of a scrubbing agent. The forming scrubbing system cools and humidifies the forming air and converts condensible, volatile gases to solid and/or liquid particulate matter. the scrubbing agent used in the forming scrubbing system, preferably water, is drained therefrom into washwater recycle system 59.

Similarly, oven air discharged from the oven process containing entrained particulate matter and volatile condensible gases, typically in lesser volume than the forming air, is passed through the oven scrubbing system of the invention, shown generally at 70. It wil be noted that the oven scrubbing system is located as closely as possible to the oven to lessen the length of duct communicating therebetween and minimize the danger of fire caused by the accumulation of particulate matter in the duct. In the oven scrubbing system, the oven air is similarly purified of entrained particulate matter by means of a scrubbing agent, preferably water. The oven scrubbing system converts condensible volatile gases to solid and/or liquid particulate matter. In this system scrubbers convert the condensible vapors to particulate matter which the precipitator can very effectively remove from the gas. The scrubbers also serve to keep the fans and ducts clean. The oven scrubbing system cools and humidifies the air.

The scrubbed forming air and oven air together with entrained particulate matter are then channeled via ducts to precipitator 80. The scrubbed forming and oven air may be sprayed prior to introduction into the precipitator to prevent the collection of dried particulate matter within the precipitator. It is advantageous to humidify the air entering the precipitator to a very high relative humidity because high relative humidity reduces evaporation of water from particulate matter which collects on the internals of the precipitator, keeping it in a soft condition so that it is easily flushed off. The ducts through which the scrubbed forming and oven air pass may be sloped to allow drainage of the spray into the precipitator. An automatic plate damper (not shown) regulated by conventional temperature sensing means may be installed near the precipitator air entry zone so that, in the event a fire develops within the precipitator, the damper may automatically shut off discharged scrubbed forming air and oven air to the precipitator. Similarly, automatic fire spray means (not shown), located proximate to the precipitator and engageable by conventional temperature sensing means, may be utilized to put out a fire in the precipitator.

Precipitator 80 may be the conventional wet electrostatic type typically including discharge electrodes (perferably having a voltage range between 40,000 to 60,000 v.), metal collector plates, and washwater spray means. In the precipitator, the scrubbed forming and oven air pass through an electric field created by the discharge electrodes, and the entrained particulate matter thereby acquires an electric charge. The air then passes across the metal collecting plates, which have a charge opposite that of the charge of the particulate matter, and the particulate matter thereby is attracted to and collects on the metal collector plates. Washwater spray means washes the particulate matter from the collector plates to increase their attraction efficiency and prevent over-accumulation of particulate matter thereon which causes fire hazards. Particulate matter discharged from the precipitator is channeled into washwater recycle system 59 and is eventually discharged via fiber and sludge removal system 31 and compactor 32. Thus, it can be seen that the air discharged from the precipitator is substantially free of entrained, pollutant particulate matter.

It will be appreciated that the effective operation of the precipitator requires the maintenance of a low level of solids in the washwater spray means, and the prevention of the accumulation of particulate matter near the tips of the washwater spray means to eliminate clogging. Saturation of the scrubbed forming and oven air in the ducts leading to the precipitator is also an important factor in the overall effectiveness of the precipitator by preventing the accumulation of dried particulate matter on the collector plates.

The cleaned air discharged from the precipitator is then passed through discharge 90, which may typically include conventional stack means, from which it is eventually emitted into the ambient environment. The stack should also provide for a sufficiently low exit velocity of the emitted air, preferably between 25 to 35 ft/sec., to prevent water droplets from being blown out of the stack.

With respect to the water system, it can be seen that water source 1 is provided to introduce the scrubbing agent, in this case water, into the purification system in the manner shown. It will be understood, however, that the description showing the introduction of the scrubbing agent into the purification and manufacturing system is for exemplary purposes, and that other suitable fresh water introduction means along the washwater recycle system are within the concept of the invention.

As shown in FIGS. 1 and 3, fresh water is introduced into oven scrubbing system 70; the oven system 70 discharges into the precipitator washwater system 85 and the precipitator washwater system 85 discharges into the forming scrubbing system 60 and fresh water is introduced into the precipitator washwater system 85, the precipitator washwater system 85 discharges into the oven scrubbing system 70 and the oven scrubbing system 70 discharges into the forming scrubbing system 60. Since the oven air present in the oven scrubbing system is hot and typically volatile, it is preferable to introduce fresh water into the oven scrubbing system as opposed to recycled washwater. Washwater discharged from the oven scrubbing system is passed into precipitator washwater system 85 for recycling into the precipitator and the forming scrubbing system.

An alternative system is illustrated in FIG. 2. Specifically, in order to minimize the accumulation of water which needs to be used up in the process and to facilitate removal of greater volume of water from the precipitator washwater system 85 to reduce solids in the precipitator washwater system 85, the fresh water is added to the precipitator washwater system 85 and discharged to the oven scrubbing system 70. Whichever system is used depends on the particular needs that apply for water handling in the particular manufacturing process. Washwater discharged from the forming scrubbing system 60 is fed into washwater recycle system 59 and recycled through the manufacturing system in the embodiments of both FIG. 2 and FIG. 3.

Specific preferred embodiments of critical portions of the purification system shown in FIG. 1 will next be described.

Referring to FIG. 2, it can be seen that in a preferred embodiment of the forming scrubbing system, shown generally at 60', includes a plurality of scrubbers 61 and 62 in parallel arrangement with respect to each other. The scrubbing agent, namely water, is introduced into the forming scrubbing system by means of oven scrubbing system 70 via washwater recycle system 59 as hereinafter described. Forming air, emitted from the forming process and containing entrained particulate matter, is passed through the scrubbers for the purpose of substantially removing entrained particulate matter, condensing volatiles to particulate matter, cooling the air and humidifying the air.

Scrubbers 61 and 62 may be of the conventional orifice type which permit the forming air to flow countercurrently to the flow of the scrubbing agent, water, sprayed from a plurality of sprayers within each scrubber. Particulate matter in the forming air is thus carried by the spray to the base region of the scrubber where it collects in a tank. The parallel arrangement of the scrubbers, a preferred embodiment of which comprises four scrubbers as shown, accommodates the plurality of air streams present in the system. The plurality of streams results from the fact that there is a variation in pack density in the forming portion of the manufacturing process which results in a plurality of suction vacuums which in turn produces air streams having dissimilar pressure and flow characteristics. It can be appreciated, therefore, that the amount of particulate matter passing through a given scrubber is substantially less than the total amount of particulate matter introduced into the forming scrubbing system. It is believed that the plurality of scrubbers may produce an increase in the overall system efficiency and scrubber effectivenss, with the result that the efficiency of the forming scrubbing system as a whole is substantially enhanced.

In a fiber glass insulation manufacturing system wherein the rate of introduction of molten glass and resin into the forming process approximates 7,250 lbs./hr. and 1,630 lbs./hr., respectively, preferable design volumes for scrubbers 61 may range between 20,000 to 24,000 (ACFM) and for scrubber 62 between 40,000 and 48,000 (ACFM).

As noted above, air and entrained particulate matter discharged from the forming scrubbing system passes through ducts where it may be sprayed by sprayer means 63 to facilitate the eventual discharge and removal of particulate matter from participator 80 and eliminate drying and clogging conditions from arising on precipitator internals. Washwater discharged from the forming scrubbing system is lead into scrubber washwater recycle system 59 from which it is ultimately recycled into the manufacturing system.

In like manner, oven air emitted from the oven process containing entrained particulate matter is passed through an oven scrubber system 70', here shown as including a plurality of impingement scrubbers 64 in the dual parallel arrangement. In this embodiment two scrubbers are used so that the air collected from each end of the oven can be scrubbed without using a long run of duct discharging into the scrubber.

The oven air typically contains volatile material which will condense when the air cools. The oven air is therefore scrubbed with water from the precipitator washwater recycle system 85 to remove the condensible materials from the oven air and transfer them to the washwater recycle system for eventual discharge via fiber and sludge removal system 31 and compactor 32. Impingement scrubbers 64 may be of the conventional Rotoclone type designed with water and air flow controlling baffles and vanes which cause water contained in the Rotoclone to scrub the air which is sucked through the water by the fan which is part of the Rotoclone equipment. Impeller means are provided against which the oven air is directed to separate entrained particulate matter and washwater from the air and discharge it into a collection chamber. For the same reasons noted above concerning the effectiveness of the parallel arrangement of forming scrubbers 61 and 62, the parallel arrangement of impingement scrubbers 64 maximize removal of particulate matter from the oven air being passed through the oven scrubbing system.

The air and entrained particulate matter discharged from the oven scrubbing system may likewise be sprayed by sprayer means 65 to facilitate the discharge and removal of particulate matter from precipitator 80 and eliminate drying and clogging conditions from arising on precipitator internals. It can be seen, therefore, that the accumulation of dried particulate matter throughout the purification system, and especially on precipitator internals, is substantially eliminated.

In a fiber glass insulation manufacturing system where in the rate of introduction of molten glass and resin into the forming process are equivalent to those noted above, a preferable design volume for impingement scrubbers 64 may range between 18,000 to 22,000 (ACFM). The design volume can be increased depending on demands of oven design and fumes desired to be removed from the manufacturing process.

The following table illustrates a detailed breakdown of design data pertaining to the components of the purification system illustrated in FIG. 2 and described above:

| FORMING SCRUBBERS 61 | |
|---|---|
| Preferred Design Volume | 20,000 to 24,000 (ACFM) |
| Inlet Air Temp. Range | 100–130 (°F.) |
| Grain Loading | 0.272 GR/DSCF (per CFM) |
| Pressure Drop Across Collector | 3–12 (in. water) |
| Scrubbing Liquid | Type - Preferably water |
| | Inlet Pressure - Gravity Flow |
| | Pumping Rate - 20–49 (gpm) |
| | Recycle Rate - 200–300 (gpm) |

| FORMING SCRUBBER(S) 62 | |
|---|---|
| Preferred Design Volume | 40,000–48,000 (ACFM) |
| Inlet Air Temp. Range | 100–130 (°F.) |
| Grain Loading | 0.272 GR/DSCF |
| Pressure Drop Across Collector | 3–12 (in. water) |
| Scrubbing Liquid | Type - Preferably water |
| | Inlet Pressure - Gravity Flow |
| | Pumping Rate - 20–40 (gpm) |
| | Recycle Rate - 400–600 (gpm) |

| OVEN SCRUBBERS 64 | |
|---|---|
| Preferred Design Volume | 18,000–22,000 (ACFM) |
| Inlet Air Temp. | 200 (°F.) |
| Grain Loading | 0.091 GR/DSCF (per CFM) |
| Pressure Drop Across Collector | 10 (in. water) |
| Scrubbing Liquid | Type - Preferably water |
| | Pumping rate - 10 (gpm) |

| ELECTROSTATIC PRECIPITATOR 80 | |
|---|---|
| Preferred Design Volume | 150,000 (ACFM) |

| -continued | |
|---|---|
| Air Temp. Range | INLET - 130 (°F.) |
| | OUTLET - 100-130 (°F.) |
| Grain Loading | 0.124 GR/DSCF (per CFM) |
| Pressure Drop Across Collector | 0.5 (in. water) |
| Inlet Air pressure | <5 (in. W.C.) |
| Velocity Across Collector Plates | 3.6 (ft./sec.) |
| Distance Between Collector Plates | 12 (in.) |
| Effective Collecting Plate Length Along Flow Path | 16 (ft.) |
| Total Plate Surface Area | 25,200 (Sq. Ft.) |
| Total Number Plates | 29 |

An alternate, specific preferred embodiment of the purification system of the invention is shown in FIG. 3. The forming scrubbing system and oven scrubbing system are shown generally at 60″ and 70″, respectively.

It will be appreciated that the flow patterns of air, particulate matter, and water in the preferred embodiment of FIG. 3 are substantially identical to those shown and described in the embodiment of FIG. 2. It is understood, as described in previous discussions, that the fresh water can be introduced into the precipitator washwater system or into the oven scrubbing system with appropriate changes of water routing as are required to preserve a dynamically interconnected system. The embodiment of FIG. 3, is intended for use in, for example, a fiber glass insulation manufacturing system wherein the rate of introduction of molten glass and resin into the forming process approximates 7,200 lbs./hr. and 1,020 lbs./hr., respectively, however it will be understood that these figures are given by way of example, and the rates of introduction may vary widely from those stated, depending on many process factors, including factors which have no significant relevance to the disclosed inventive concept.

Conventional forming scrubbers 66 and 67 may be of the venturi type, wherein water and air are forced through a small nozzle, or construction, which results in good mixing and air-water contact. A preferred embodiment of the forming scrubbing system comprises three forming scrubbers 66 in parallel arrangement with the two scrubbers 67. Preferable design volumes of these scrubbers may range between 40,000 to 48,000 (ACFM) for scrubbers 66 and between 20,000 to 24,000 (ACFM) for scrubbers 67. It should be understood that scrubbers of substantially equal capacity may be used if desired; here, the provision of two smaller scrubbers provides closer process control to the system operator.

Oven impingement scrubbers 68 may likewise be of the rotoclone venturi type, having a design volume ranging between 18,000 to 22,000 (ACFM).

The following table illustrates a detailed breakdown of operating data pertaining to the components of the purification system illustrated in FIG. 3 and described above:

| FORMING SCRUBBERS 66 | |
|---|---|
| Preferred Design Volume | 40,000–48,000 (ACFM) |
| Inlet Air Temp. Range | 100-130 (°F.) |
| Grain Loading | 0.101 GR/DSCF (per CFM) |
| Pressure Drop Across | |
| Inlet Size | 46 (in.) |
| Outlet Size | 24 (in.) |
| Scrubbing Liquid | Type - Preferably water |
| | Inlet Pressure - 5-7 (psig) |
| | Pumping Rate - 10 (gpm) |
| | Recycle Rate - 400-440 (gpm) |
| FORMING SCRUBBERS 67 | |
| Preferred Design Volume | 20,000-24,000 (ACFM) |
| Inlet Air Temp. Range | 100-130 (°F.) |
| Grain Loading | 0.101 GR/DSCF (per CFM) |
| Pressure Drop Across Collector | 10 (in. water) |
| Inlet Size | 30 (in.) |
| Throat Size | 23 (in.) |
| Scrubbing Liquid | Type - Preferably water |
| | Inlet Pressure - 5-7 (psig) |
| | Pumping Rate - 10 (gpm) |
| | Recycle Rate - 200-220 (gpm) |
| OVEN SCRUBBERS 68 | |
| Preferred Design Volume | 18,000-22,000 (ACFM) |
| Inlet Air Temp. | 200 (°F.) |
| Grain Loading | 0.056 GR/DSCF (per CFM) |
| Pressure Drop Across Collector | 10 (in. water) |
| Scrubbing Liquid | Type - Preferably water |
| | Puming Rate - 10 (gpm) |
| ELECTROSTATIC PRECIPITATOR 80 | |
| Preferred Design Volume | 216,000 (ACFM) |
| Air Temp. Range | Inlet - 130 (°F.) |
| | Outlet - 100-120 (°F.) |
| Grain Loading | 0.052 GR/DSCF (per CFM) |
| Pressure Drop Across Collector | 0.5 (in water) |
| Inlet Air Pressure | <5 (in. W.C.) |
| Velocity Across Collector Plates | 4.0 (ft. sec.) |
| Distance Between Collector Plates | 12 (in.) |
| Effective Collecting Plate Flow Path | 19 (ft.) |
| Total Plate Surface Area | 32,300 (sq. ft.) |
| Total Number of Plates | 35 |

A modification of the rotary process fiber glass insulation manufacturing system of FIG. 1 is shown in FIG. 4. Specifically, it will be noted that the system illustrated in FIG. 4 is substantially the same as that shown in FIG. 1 and described above, except that the system of FIG. 4 does not include an electrostatic precipitator which is a costly and relatively complicated (and somewhat dangerous) piece of equipment. It will also be appreciated that except for the modifications hereinbelow described, the characteristics of the system illustrated in FIG. 1 are applicable to the embodiment of FIG. 4.

With respect to the purification system of FIG. 4, it will be understood that air and entrained particulate matter discharged from the forming process is passed through scrubbers 20, which are disposed in parallel arrangement with respect to each other, to maximize removal of particulate matter in the scrubbing process as previously noted. Water is provided to scrubbers 20 by means of the washwater recycle system. Washwater and entrained particulate matter discharged from scrubbers 20 are carried to washwater recycle system 59, wherein the water is ultimately recycled to the manufacturing process and the particulate matter is eventually discharged via fiber and sludge removal system 31 and compactor 32. Air discharged from scrubbers 20 is passed through discharge means 90, typically comprising conventional stack means as previously noted, and is ultimately emitted into the atmosphere at environmentally suitable levels.

Scrubbers 20 may be of the conventional venturi type, providing for increased velocity of the forming air flowing concurrently with the flow of the scrubbing agent; i.e.: water, in the respective scrubbers. Particulate matter is thereby removed from the forming air and is carried by the scrubbing agent to the base region of the scrubbers where it collects in a tank. In a preferred embodiment, the forming scrubbing system comprises two scrubbers 20, although only one scrubber may be used, or additional scrubbers may be added, within the concept of the invention.

It will also be noted that oven air and entrained particulate matter discharged from the oven process are channeled through impingement scrubber 21, located in close proximity to oven 56 to minimize the length of duct communicating therebetween and thereby minimize fire risks. Scrubber 21 may be of the conventional rotoclone type. Impeller means are provided against which the oven air is directed to separate entrained particulate matter from the air and discharge it into a collection chamber. The scrubbing agent, fresh water, is introduced into scrubber 21 from water source 1. In a preferred embodiment, only one scrubber 21 may be used, however, the addition of other scrubbers is within the concept of the invention.

Air and entrained particulate matter discharged from scrubber 21 is channeled into the forming process, from which the particulate matter is ultimately discharged and further purified with the forming air by means of venturi scrubbers 20 and discharge means 90. It will be appreciated that cycling of the scrubbed oven air into the forming process reduces the total volume of air handled in the purification system which maximizes efficiency. It will also be noted that the forming process itself acts as a purification means for the scrubbed oven air introduced therein since at least some particulate matter entrained in the scrubbed oven air will be integrated into the green product.

In a fiber glass insulation manufacturing system wherein the rate of introduction of molten glass and resin into the forming process approximates 2,000 lbs./hr. and 300 lbs./hr., respectively, preferable design volumes for scrubbers 20 may range between 23,000 to 27,000 (ACFM) and for scrubber 21 between 13,000 to 17,000 (ACFM).

The following chart illustrates a detailed breakdown of operating data pertaining to the components of the purification system illustrated in FIG. 4 and described above:

| FORMING SCRUBBERS 20 | |
| --- | --- |
| Preferred Design Volume | 23,000–27,000 (ACFM) |
| Inlet Air Temp. Range | 100–130 (°F.) |
| Grain Loading | 0.172 GR/DSCF |
| Pressure Drop Across Collector | 22 (in. water) |
| Inlet Size | 30 (in.) |
| Throat Size | 23 (in.) |
| Scrubbing Liquid | Type - Preferably water |
| | Inlet Pressure - 5–7 (psig) |
| | Pumping Rate - 2 (gpm) |
| | Recycle Rate - 10 gal. per 1,000 ACFM |
| OVEN SCRUBBER(S) 21 | |
| Preferred Design Volume | 13,000–17,000 (ACFM) |
| Inlet Air Temp. | 200 (°F.) |
| Grain Loading | 0.043 GR/DSCFM |
| Pressure Drop Across Collector | 10 (in. water) |
| Scrubbing Liquid | Type - Preferably water |
| | Pumping Rate - 0.2 (gpm) |

Although preferred embodiments of the invention have been illustrated and described, it will be apparent to those skilled in the art that variations and modifications may be made within the scope of the inventive concept. Accordingly, it is intended that the scope of the hereinafter appended claims when interprested in light of the prior art, and not by the scope of the specific, exemplary preceding descriptions.

I claim:

1. In a method of purifying waste emissions in the manufacture of fiber glass insulation, the steps of
   directing air emitted from a forming process into a forming scrubbing system wherein said forming air is substantially saturated so as to remove a substantial portion of the entrained particulate matter from said forming air,
   directing air emitted from an oven process into an oven scrubbing system wherein said oven is substantially saturated so as to remove a substantial portion of the entrained particulate matter from said oven air,
   directing scrubbed forming air emitted from said forming scrubbing system into precipitator means to remove substantially the balance of the entrained particulate matter in said scrubbed forming air,
   directing scrubbed oven air emitted from said oven scrubbing system into said precipitator means to remove substantially the balance of the entrained particulate matter in said scrubbed oven air, and
   discharging air emitted from said precipitator means from the system.

2. The method of claim 1 further characterized in that said air discharged from said precipitator means is directed into stack means for further purification prior to discharge into the atmosphere.

3. The method of claims 1 and 2 further characterized in that said scrubbed forming air and scrubbed oven air are saturated prior to entry into said precipitator means.

4. The method of claim 3 further characterized in that said step of directing said forming air into said forming scrubbing system includes passing said forming air through a plurality of forming scrubber means wherein said forming air is firstly, saturated by a scrubbing agent, and, secondly, intermix with said scrubbing agent so as to substantially remove entrained particulate matter therefrom, and said step of directing said oven air into said oven scrubbing system includes passing said oven air through a plurality of oven scrubbing means wherein oven air is, firstly, saturated by a scrubbing agent, and, secondly, said particulate matter entrained in said oven air is intermixed with said scrubbing agent so as to substantially remove said particulate matter.

5. The method of claim 4 further characterized in that said steps of channeling said forming air and said oven air through said forming scrubbing means and said oven scrubbing means, respectively, include the steps of increasing the velocity of said forming air and said oven air passing through said forming scrubbing means and said oven scrubbing means.

6. In a method of purifying waste emissions in the manufacture of fiber glass insulation, the steps of
   directing air emitted from a forming process into a forming scrubbing system wherein said forming air matter is saturated so as to firstly, condition said forming air for subsequent processing, and, secondly, intermix with said matter so as to substantially remove entrained particulate matter from said forming air, directing air emitted from an oven process into an oven scrubbing system wherein said oven air is water saturated so as to firstly, condition said forming air for subsequent processing, and, secondly, intermix said oven air with said water waste so as to substantially remove entrained particulate matter from said oven air, returning scrubbed oven air emitted from said oven scrubbing system into the system upstream from the forming scrubbing system, and directing scrubbed forming air emitted from said forming scrubbing system directly into stack means wherein further purification may occur prior to discharge into the atmosphere.

7. In combination in a system for purifying waste product emissions associated with the manufacture of glass fibrous products, a forming station wherein a fibrous product which includes at least glass and resin are formed into an uncured, or partially uncured, coherent mass, means for contacting said fibrous product with heated air and water to form said fibrous product into a partially used product, said means including a source of forming air and a liquid scrubbing agent, a forming air scrubbing system wherein air used to form said fibrous product into a partially cured product is treated, said treatment including the precipitation of particulate material from said air, means for contacting the aforesaid partially cured product with heated air and water to form a cured product, a curing air scrubbing system wherein air used to cure said partially cured product is treated, said treatment including the precipitation of particulate material from said air, and stack means wherein final particulate removal is effected and the resultant air and, if any, particulate material, discharged to the ambient environment.

8. The waste product emission purification system of claim 7 further characterized by and including electrostatic precipitation means, said electrostatic precipitation means being disposed in the system downstream from the forming air and curing air scrubbing systems, and upstream from the stack means, said electrostatic precipitation means being effective to remove substantially all of the particulate material entering the electrostatic precipitation means, said forming air and curing air scrubbing means being effective to substantially saturate the air discharged therefrom, wherein said air enteres the electrostatic precipitation means in a substantially saturated condition.

* * * * *